(12) United States Patent
Ascolese et al.

(10) Patent No.: US 7,706,788 B2
(45) Date of Patent: Apr. 27, 2010

(54) METHOD FOR NETWORK SELECTION IN COMMUNICATION NETWORKS, RELATED NETWORK AND COMPUTER PROGRAM PRODUCT THEREFOR

(75) Inventors: Antonio Ascolese, Turin (IT); Luciana Costa, Turin (IT); Luca Dell'Uomo, Turin (IT); Simone Ruffino, Turin (IT); Marco Spini, Turin (IT)

(73) Assignee: Telecom Italia S.p.A., Milan (IT)

( * ) Notice: Subject to any disclaimer, the term of this patent is extended or adjusted under 35 U.S.C. 154(b) by 416 days.

(21) Appl. No.: 10/562,927

(22) PCT Filed: Jun. 30, 2003

(86) PCT No.: PCT/IT03/00409

§ 371 (c)(1),
(2), (4) Date: Dec. 30, 2005

(87) PCT Pub. No.: WO2005/002140

PCT Pub. Date: Jan. 6, 2005

(65) Prior Publication Data

US 2006/0153135 A1    Jul. 13, 2006

(51) Int. Cl.
*H04W 4/00* (2009.01)
*H04M 1/66* (2006.01)
*H04L 12/28* (2006.01)

(52) U.S. Cl. ............... 455/432.1; 455/411; 455/435.1; 370/338; 370/401

(58) Field of Classification Search ................ 370/338; 455/432.1, 432.3, 435.2

See application file for complete search history.

(56) References Cited

U.S. PATENT DOCUMENTS

| | | | | |
|---|---|---|---|---|
| 6,421,339 B1 * | 7/2002 | Thomas | ...................... | 370/352 |
| 6,728,536 B1 * | 4/2004 | Basilier et al. | ........... | 455/432.1 |
| 6,915,345 B1 * | 7/2005 | Tummala et al. | ......... | 455/432.1 |
| 2001/0012777 A1 * | 8/2001 | Igarashi et al. | ............... | 455/435 |
| 2002/0164983 A1 * | 11/2002 | Raviv et al. | ................. | 455/432 |
| 2003/0091030 A1 * | 5/2003 | Yegin et al. | ................. | 370/352 |

(Continued)

FOREIGN PATENT DOCUMENTS

EP     1111872 A2 *    6/2001

(Continued)

OTHER PUBLICATIONS

Authors: Byung-Gil Lee, Hyun-Gon Kim, Sung-Won Sohn and Kil-Houm Park; Title: Concatenated Wireless Roaming Security Association and Authentication Protocol Using ID-Based Cryptography; Date: Apr. 22-25, 2003; vol. 3; pp. 1507-1511.*

(Continued)

*Primary Examiner*—Nick Corsaro
*Assistant Examiner*—Tangela T. Chambers
(74) *Attorney, Agent, or Firm*—Finnegan, Henderson, Farabow, Garrett & Dunner, L.L.P.

(57) ABSTRACT

At least one user is given access to a respective home operator over a communication network such as an IP network, via an access network and through any of a plurality of supported visited networks. The user is communicated a list of the supported visited networks and is thus given the possibility of selecting one of the supported visited networks as the path for reaching the respective home operator.

22 Claims, 7 Drawing Sheets

U.S. PATENT DOCUMENTS

| | | | |
|---|---|---|---|
| 2003/0214958 A1* | 11/2003 | Madour et al. | 370/401 |
| 2004/0029587 A1 | 2/2004 | Hulkkonen et al. | |
| 2004/0066756 A1* | 4/2004 | Ahmavaara et al. | 370/338 |
| 2004/0203751 A1* | 10/2004 | Banaei | 455/432.1 |

FOREIGN PATENT DOCUMENTS

| | | |
|---|---|---|
| WO | WO 9916267 A1 * | 4/1999 |
| WO | WO 2004/034714 A1 | 4/2004 |

OTHER PUBLICATIONS

"Feasibility Study on 3GPP System to Wireless Local Area Network (WLAN) Interworking: (Release 6)", 3$^{rd}$ Generation Partnership Project, 3GPP TR 22.934, vol. 6.1.0, pp. 1-30, (2002).

"WLAN Network Selection", San Diego Meeting, 12-16, 3GPP S2-031899, 2 pages, (2002).

"Network Selection", San Diego Meeting, 3GPP TSG-SA2 #32, S2-031864, 5 pages, (2003).

Calhoun et al., "Diameter Base Protocol", XP-002264843, IETF, pp. 1-78, (2002).

Blunk et al., "Extensible Authentication Protocol (EAP)", IETF, pp. 1-54, (2003).

"3GPP System to Wireless Local Area Network (WLAN) Interworking: (Release 6)", 3$^{rd}$ Generation Partnership Project, 3GPP TS 23.234, vol. 1.910.0, pp. 1-77, (2003).

Arkko et al., "EAP AKA Authentication", Internet Draft, pp. 1-56, (2003).

Haverinen et al., "EAP SIM Authentication", Internet Draft, pp. 1-58, (2003).

English Translation of Notice of Preliminary Rejection issued by Korean Intellectual Property Office dated Dec. 9, 2009 for counterpart Korean Patent Application No. 10-2005-7025034.

* cited by examiner

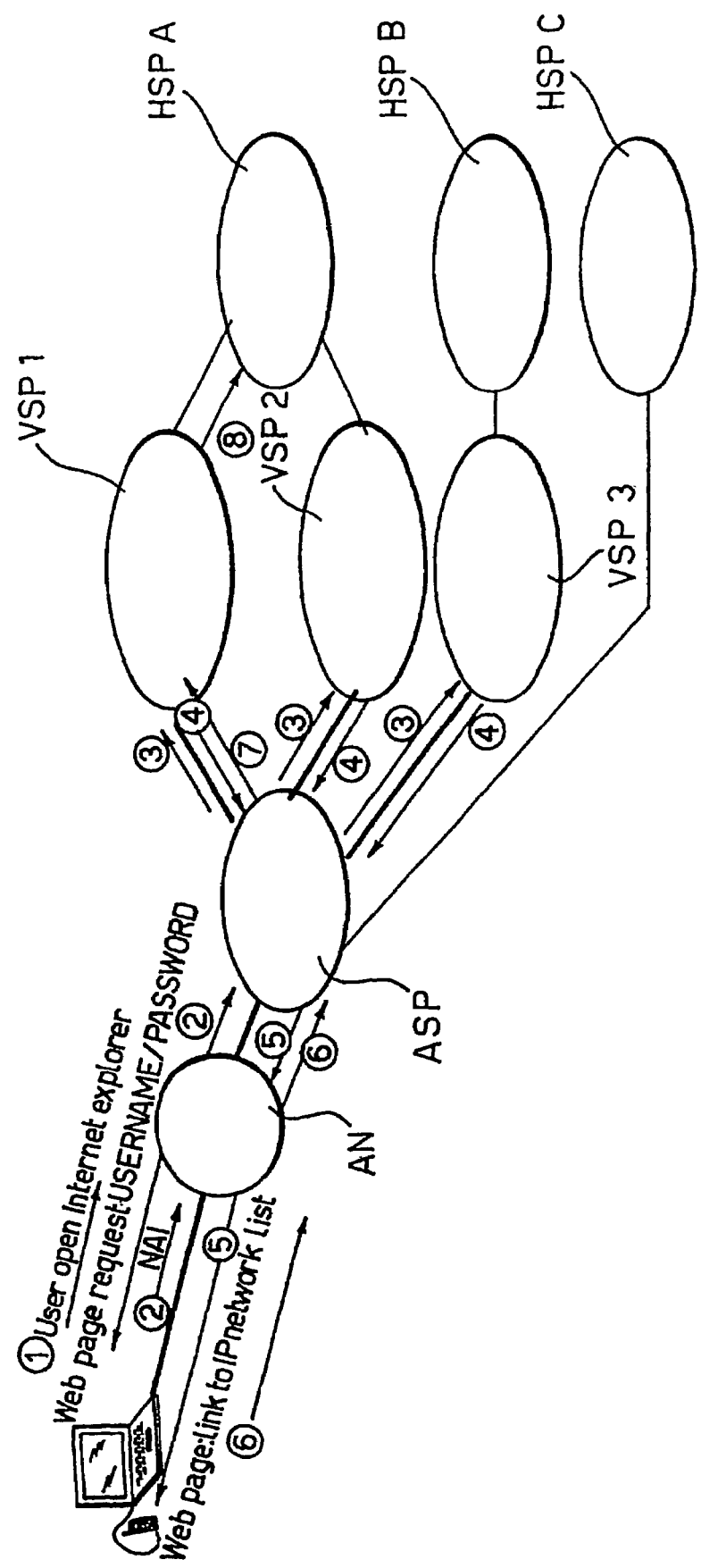

US 7,706,788 B2

METHOD FOR NETWORK SELECTION IN COMMUNICATION NETWORKS, RELATED NETWORK AND COMPUTER PROGRAM PRODUCT THEREFOR

CROSS REFERENCE TO RELATED APPLICATION

This application is a national phase application based on PCT/IT2003/000409, filed Jun. 30, 2003, the content of which is incorporated herein by reference.

FIELD OF THE INVENTION

The invention relates to network selection procedures for communication networks, e.g., Internet Protocol (IP) networks such as wired and wireless local area networks (LANs). More specifically, the invention relates to arrangements wherein a plurality of network operators share an IP network.

DESCRIPTION OF THE RELATED ART

The possibility for several network operators and internet service providers (ISPs) of being jointly present in a IP network, such as a wireless LAN (WLAN) and supporting roaming is a key requirement for the deployment of a Public WLAN, as described e.g. in 3GPP TR 22.934 v 6.1.0 "Feasibility study on 3GPP system to Wireless Local Area Network (WLAN) interworking (Release 6)", December 2002. The capability of permitting roaming and allowing a user to choose an appropriate network is also requested by several national regulatory bodies.

Currently available access procedures to data networks of service providers have only a very limited flexibility. In fact, the provider of the access network has usually contracted trades with other internet providers. The customers of these providers can access the respective networks through the network access facilities of the provider of the access network. Typically, the operator providing access to the network will in turn have agreements also with other providers or operators; in many cases, however, the operator providing access to the network to a certain user has not a direct roaming agreement with the home operator of that user, but only with one or more third operators that in turn may have agreements with the user's home operator.

The customers of these providers or operators will not generally be aware of these agreements. Finding themselves in the coverage area of a given wireless internet service provider (WISP) they will not have the possibility of knowing where the authentication information will be sent and therefore what transport networks will carry their data.

A corresponding roaming scenario is represented in FIG. 1. There, two users A and B are shown. These users are subscribers to services provided by two respective home service providers, namely HSPA and HSPB. Both of A and B want to access the services of their HSPs from a generic access service provider ASP through its access network AN. The provider ASP could have a direct roaming agreement with certain visited service providers, such as e.g. VSP1 and VSP2. These, in turn, may both have a roaming agreement with HSPA. These latter agreements may however differ, e.g. in terms of pricing and quality of service (QoS) granted. The access provider ASP could also have a direct roaming agreement with another visited service provider VSP3 having in turn a roaming agreement with HSPB. Finally the access provider ASP might also have a direct agreement with another "home" service provider of a user C., namely HSPC.

During authentication of clients requesting access to the network AN, the access service provider ASP will send an authentication request to one of the service providers directly connected thereto, namely VSP1, VSP2, VSP3 or HSPC. In fact the access service provider ASP is not in a position to authenticate users A and B locally. In current arrangements, the access service provider ASP will take the corresponding decisions in an autonomous way, without receiving from the users A or B any input data other than their identity. Such a situation may explain why network advertising, i.e., the announcement of network operators available in a given public WLAN and the need for network selection are described in documents such as 3GPP S2-031899 "WLAN Network selection", San Diego Meeting, 12-16 May 2003, while indicating that the mechanism for network advertising is still "to be discussed".

An alternative arrangement based on XML meta-language has been proposed by document 3GPP S2-031864 "Network Selection", San Diego Meeting, 12-16 May 2003. The corresponding arrangement has the disadvantage of requiring XML pre-configuration. Furthermore, the XML code has an increased amount of tagging information, which requires a greater amount of bits to be transmitted.

OBJECT AND SUMMARY OF THE INVENTION

The object of the present invention is thus to provide an arrangement that overcomes the drawbacks of the prior art arrangements as outlined in the foregoing.

According to the present invention, that object is achieved by means of a method having the features set forth in the claims that follow.

The present invention also relates to a corresponding communication network and a computer program product loadable in the memory of at least one computer and including software code portions for performing the method of the invention. Reference to at least one computer is evidently intended to take into account that the method of the invention is adapted to be carried out in a decentralized manner, with different tasks being allotted to different computers in a network.

In brief, an arrangement is described where a user wishing to access—via a third-party access network—the network of one of his providers, is enabled to choose the intermediate network(s) to which i.a. the authentication information shall be passed.

In that way, the user will also be able to select the path his or her data will follow, in the case that his provider has a number of roaming agreements with other providers that, in turn, have agreements with the provider acting as the access provider.

This arrangement is independent from the access technology deployed within the access network. This can be either wireless (e.g., a WLAN network) or wired (e.g., a PSTN network with dial-up access). For the sake of simplicity, a wireless LAN will be steadily referred to in the following as a preferred example.

The provider acting as the access service provider is in charge of communicating the possible alternatives to the users, thus enabling them to make their choices.

The arrangement described herein solves i.a. the problem of network advertising as presented in the document 3GPP SA2-031899 already mentioned in the foregoing.

A preferred embodiment of the arrangement described herein is based on the so-called Diameter agent supported in a Diameter base protocol. The basic related information is provided, e.g., in IETF draft-ietf-aaa-diameter-17.txt, "Diameter Base Protocol". The Diameter agent is used to provide an authentication, authorization and accounting (AAA) framework for applications such as network access or IP mobility. Essentially, a Diameter agent is a Diameter node that provides either relay, proxy, redirect or translation services. Specifically, the arrangement described herein provides for certain modifications being made in the way specific Diameter requests are processed and the relative answers are created by the Diameter agent when these authentication requests have an unknown realm.

Currently, these requests would be discarded or, in the best case, would be forwarded towards a default authentication server. With the proposed modifications a Diameter agent can retrieve the information necessary to correctly process the authentication request thus giving the user the possibility of choosing the visited authentication server to which the Diameter agent must forward the request.

Those of ordinary skill in the art will appreciate that the same arrangement could also be used with other "triple-A" protocols such as, e.g., the protocol currently referred to as Remote Authentication Dial-In User Service (RADIUS): this does not provide for explicit support for agents, including so-called proxies, redirects and relays. The expected will not be defined, as this may vary for different implementations.

The list of supported visited networks having a roaming agreement with a certain user's "home" ISPs are sent to the user by the authentication server of the provider acting as the access provider. This preferably occurs during the user authentication procedure, using an extensible authentication protocol (EAP). This authentication protocol (as described, e.g., in IETF draft-ietf-eap-rfc2284bis-03.txt) supports multiple authentication mechanisms and typically runs directly over the link.

For this purpose, a modification to the EAP procedure is advisable that consists in adding two messages to the normal sequence of packets exchanged during the authentication. However, the method proposed should be supported by a generic authentication mechanism independently of the underlying WLAN standard.

The main advantage of the arrangement in question lies in that no need exists of modifying the local access device, since any modification can be implemented at the client terminal and in the AAA servers.

BRIEF DESCRIPTION OF THE DRAWINGS

The invention will now be described, by way of example only, by referring to the enclosed figures of drawing, wherein:

FIG. 7 is another functional block diagram schematically representing a network selection procedure.

DETAILED DESCRIPTION OF PREFERRED EMBODIMENTS OF THE INVENTION

The exemplary detailed description provided herein refers to a network selection procedure applied to a public land mobile network (PLMN). Specifically a user equipment accessing a 3GPP system over a WLAN will be considered as an example.

In general terms, the procedure follows the network selection principles described in the document 3GPP TS 23.234 "3GPP system to Wireless Local Area Network (WLAN) Interworking; System Description (Release 6)".

Figure 1:
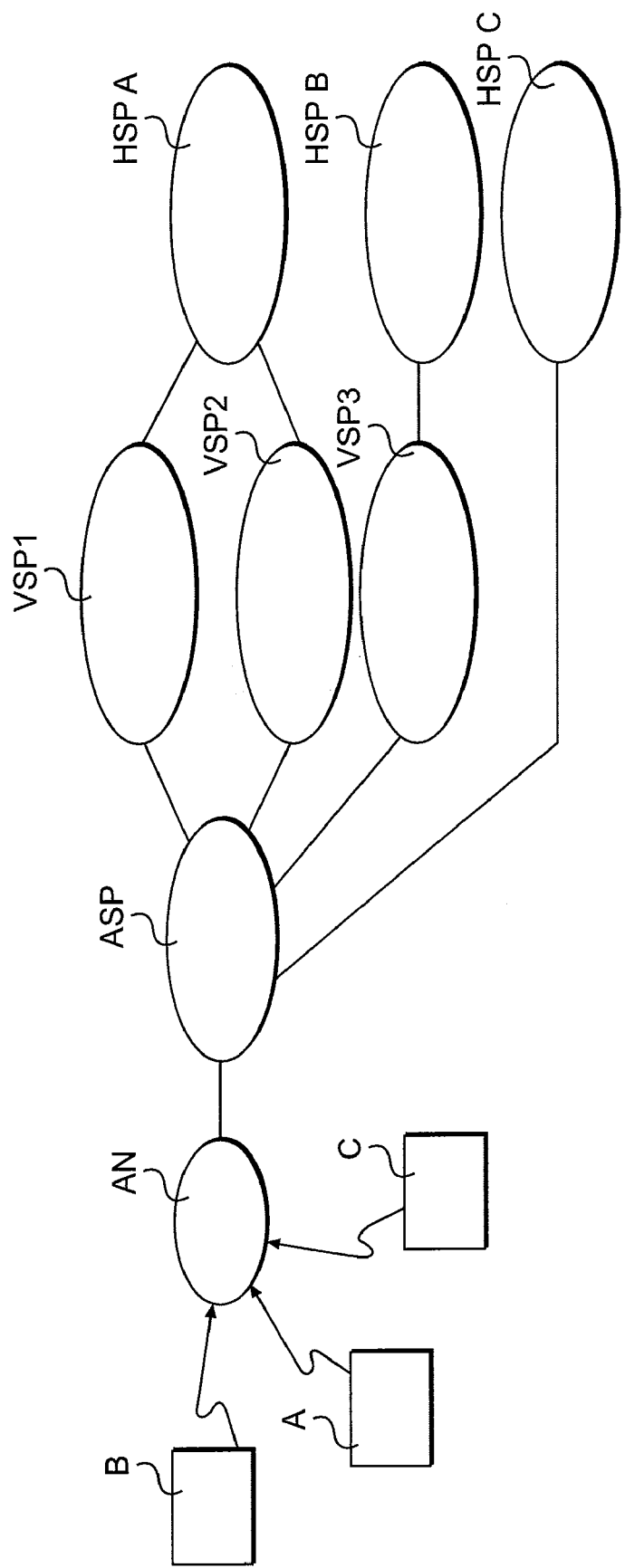
FIG. 1, per se related both to the prior art and to the invention, has been already described in the foregoing.
Figure 2:
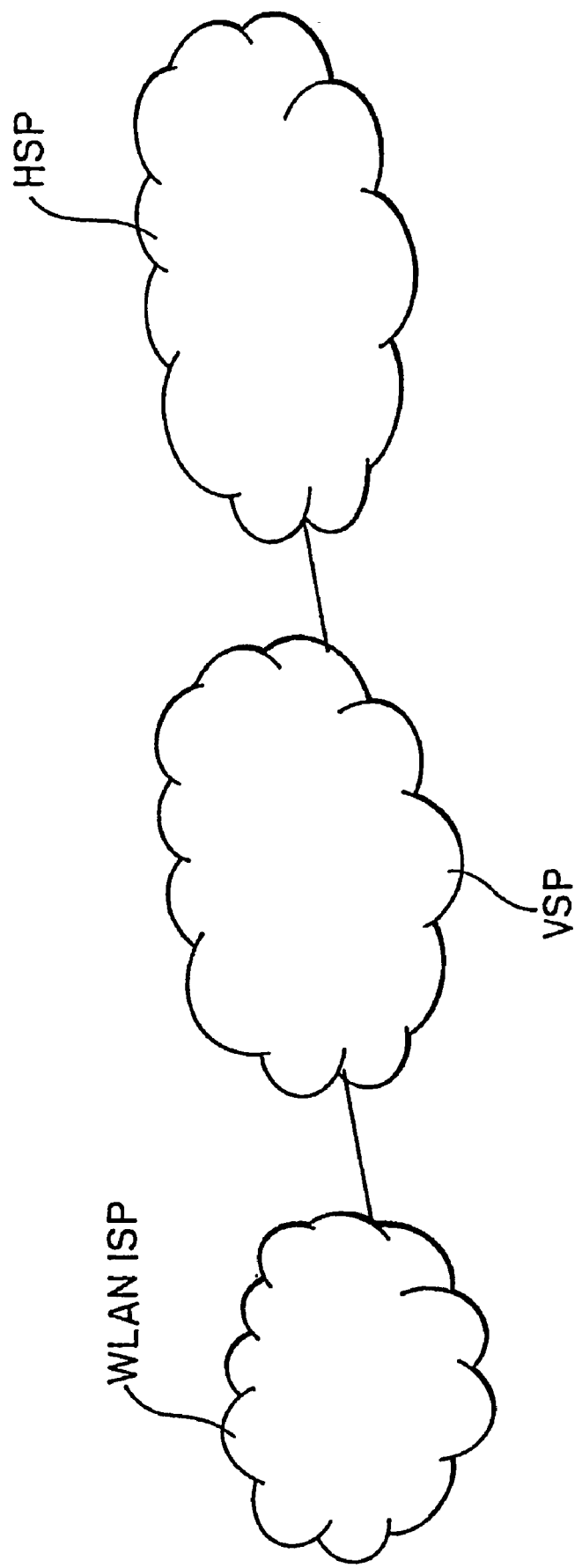
FIG. 2 is a diagram illustrative of a simplified interworking model.

Radio access network sharing or provider selection is used for network selection in 3GPP-WLAN interworking. In FIG. 2 a simplified interworking model is presented where all the players are shown i.e. a WLAN internet service provider WLAN ISP, a visited 3G operator VSP, and a home 3G operator HSP.

It will be assumed that a 3G subscriber wishes to utilize the resources and access to services within the respective own 3GPP operator network.

The goal of 3G-WLAN interworking is to extend 3GPP services and functionality to the WLAN access environment. Thus the WLAN effectively becomes a complementary radio access technology to the 3GPP system. 3G-WLAN interworking shall be independent of the underlying WLAN radio technology.

The WLAN provides access to services that can be located either in the WLAN itself or in a network that is connected to the WLAN. However, it may be reasonably assumed that the WLAN will not have roaming agreements with all 3G operators. Usually the WLAN operator (or the WLAN service provider) will be in technological partnership with a limited number of 3G operators (i.e. the "visited" operators VSP) to provide connectivity towards other 3G networks (including the "home" network provider from the user's viewpoint).

Figure 3:
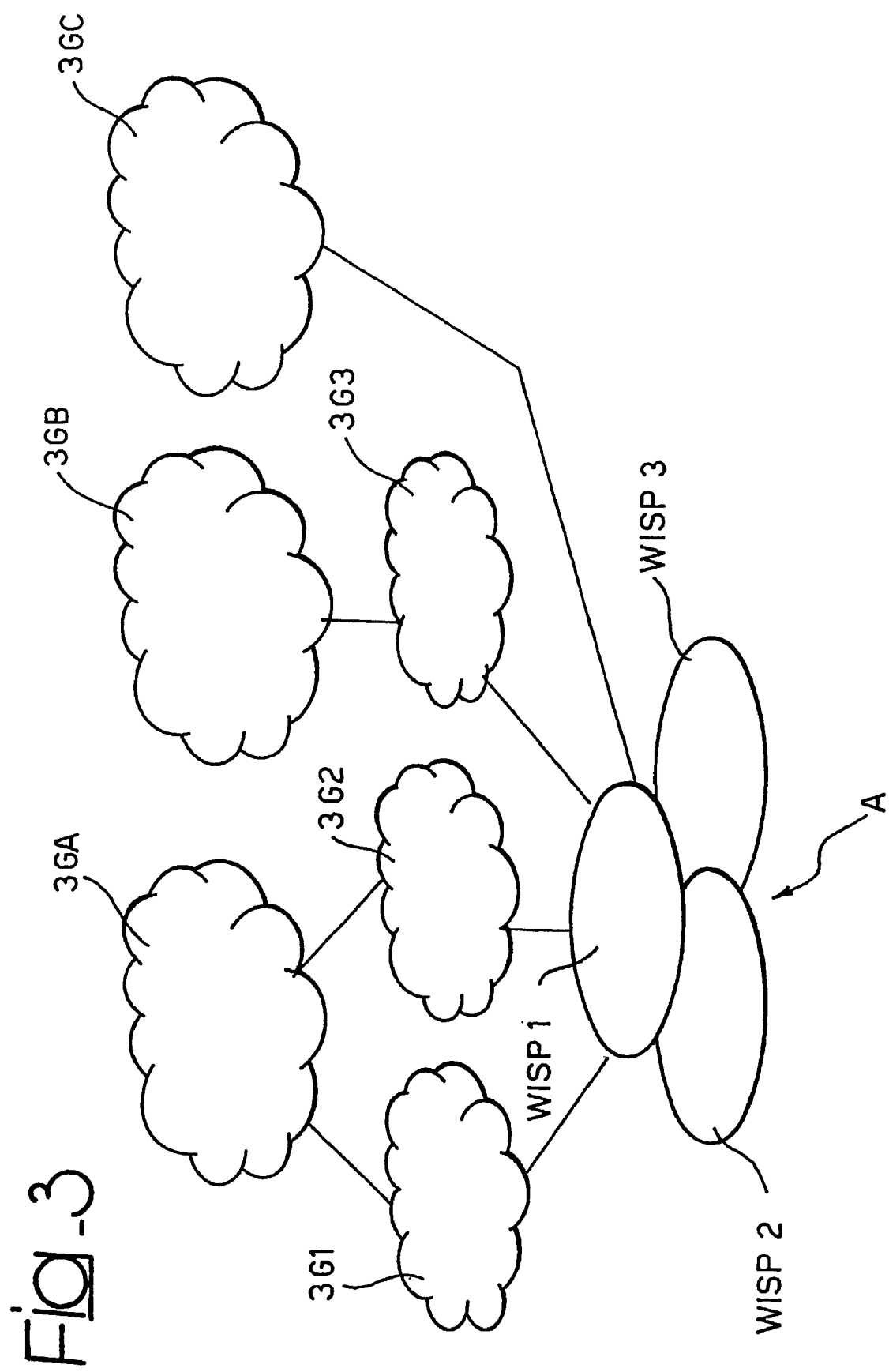
FIG. 3 is a diagram illustrative of a specific roaming scenario

Specifically, a scenario of the kind illustrated in FIG. 3 will be considered.

There, an area is shown covered by a set of overlapping WLAN internet service providers (WISP) designated WISP1, WISP2, and WISP3, respectively. Each of the providers WISP1, WISP2, and WISP3 is possibly distinguished by different WLAN channels and different (and not exclusive) roaming agreements with several 3G operators 3G1, 3G2, 3G3.

A generic user entering this area may desire to connect to his or her own specific "home" network 3GA, 3GB, or 3GC to which he or she is a subscriber. This in order to be authenticated and to access services located either in the WLAN itself or in a network connected to the WLAN and having a specific agreement with the home 3G operator.

The arrangement described is intended to give the user the possibility of selecting a signaling path to obtain authentication and authorization from the home network. Any subsequent user data flow will in fact be highly likely to follow the same path used for signaling. The possibility thus exist for the user of making choices between different commercial agreements, e.g., in terms of pricing and quality of service (QoS) granted.

Referring to FIG. 3, the user subscribing to the services provided to the 3G operator 3GA can reach the associated home network in two different ways, e.g. via either of visited operators 3G1 and 3G2.

The prior art fails to provide any specific mechanism for making a choice between the two.

This applies, e.g., to the IEEE 802.11 standard, but similar remarks apply to other WLAN technologies. In fact, in the case of IEEE 802.11 WLANs, the WLAN network name is conveyed over the WLAN beacon signal in the so-called SSID (Service Set ID) information element. The possibility also exists for a user equipment (UE) to actively solicit support for specific SSIDs by sending a probe request message and by receiving a reply if the access point does support the solicited SSIDs defined by IEEE 802.11. However, in such prior art arrangements the user will not become aware of the set of supported visited networks and thus possibly select the path for reaching the desired home operator by using this mechanism.

The arrangement described herein suggests a mechanism for the WISP authentication server to send to the user a list of the supported visited networks that have a roaming agreement with the user's home internet service provider.

This happens during the user's authentication procedure, that is, when an user sends out his or her credentials.

In the case of WLAN-3G system interworking, support in that respect can be provided by a generic authentication mechanism (independently of the underlying WLAN standard), such as, e.g., the extensible authentication protocol currently referred to as EAP. In the case of 3G users the authentication mechanism to be transported may thus be based, e.g., on the existing EAP/AKA authentication mechanism described in the Internet Draft "draft-arkko-pppext-eap-aka-09.txt", "EAP AKA Authentication", February 2003. An alternative may be represented by the EAP/SIM authentication mechanism described in the Internet Draft "draft-haverinen-pppext-eap-sim-10.txt", "EAP SIM Authentication", February 2003.

The corresponding access authentication server (AauS) will be assumed to reside in the WISP (i.e. any of the elements indicated as WISP1, WISP2 and WISP3 in FIG. 3). This is typically a Diameter node with the function of Diameter proxy/relay (DRL) Agent.

The visited authentication server (VauS) will be assumed to reside in the visited 3G Operator (i.e. any of 3G1, 3G2 or 3G3 in FIG. 3) and is a Diameter node that acts as a Diameter relay/proxy agent (DRL) and also as a Diameter redirect agent (DRD). A Diameter implementation may act as one type of agent for some requests, and as another type of agent for others. A Diameter agent is thus present in the VauS in order to act as:

a proxy/relay agent for those requests that must be forwarded towards a visited authentication server (VauS) identified at the AauS, and as a redirect agent for those authentication requests that have an unknown realm.

In a presently preferred embodiment of the invention, the user is identified univocally by means of an identifier.

This may be, e.g., the network access identifier known as NAI described, e.g., in RFC 2486 3GPP S2-031864 "Network selection", San Diego Meeting, 12-16 May 2003.

Figure 4:
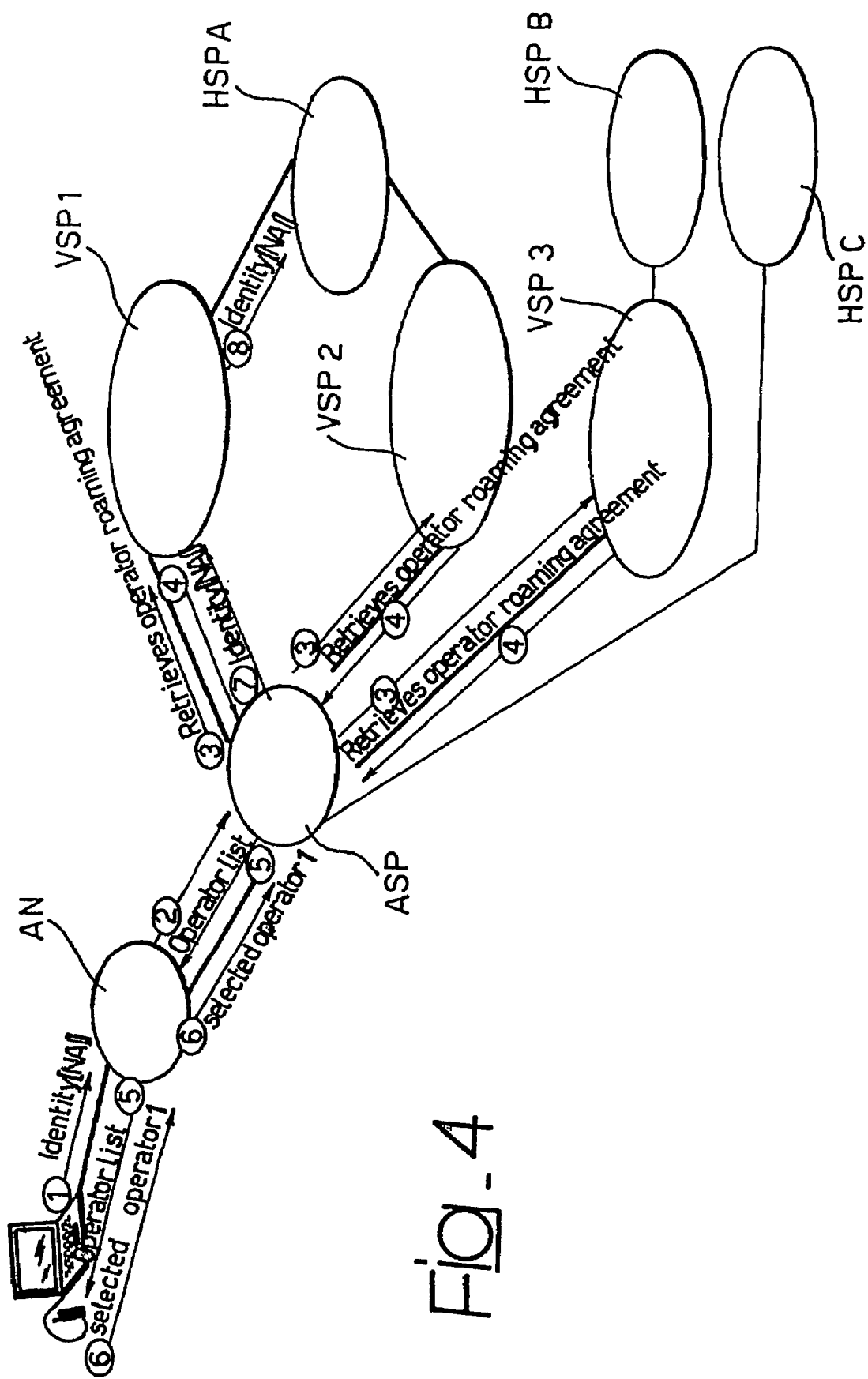
FIG. 4 is a functional block diagram schematically representing a generalized network selection procedure.

In such a preferred embodiment, which is illustrated in FIG. 4. the user sends his or her credentials to the access network (which may occur by means of either a wired device or a wireless device) via an AN (FIG. 4, Step 1 and Step 2). The access network forwards these credentials to a back-end authentication server, located at the data center of the access service provider. The authentication server retrieves the available roaming networks for that user, identified through the realm part of the NAI. To accomplish this task, the server initiates a conversation with the servers belonging to the providers to which it is connected (FIG. 4, Step 3). As a result, the authentication server retrieves the list of operators that hold a roaming agreement with the user's operator(s) (FIG. 4, Step 4). This procedure is performed only once when a first authentication request is received by the authentication server in respect of a user for which no direct roaming agreements exist with the home server provider of such a user. The authentication server also forwards, via the access network, a list of operators to the user (FIG. 4, Step 5). The user chooses one of the operators from the list received from the server, according to his or her preferences, or based on some pre-configured settings. When presented with such a list, the user will send the chosen operator identifier back to the authentication server in the access network (FIG. 4, Step 6). The authentication server will forward to the provider chosen by the user the authentication request. containing the user's credentials (FIG. 4, Step 7).

Of course, in the case the provider acting as the access provider has a direct roaming agreement with the user's home service provider, the user will be presented with a list comprised of one operator only. Alternatively, under these circumstances, the authentication server may simply decide to directly forward the authentication request to the user's home service provider.

The user will then perform a usual authentication procedure with his service provider (for example. using a standard mechanism like EAP). While performing the steps of this procedure, the authentication information flows through the network of the previously chosen operator. Specifically, the authentication server will forward authentication messages to the visited authentication server. These will in turn proxy such messages to the home operator server, i.e., the home authentication server (FIG. 4. Step 8). Being given the possibility of choosing the provider to which the access service provider will forward the authentication request, the users will in fact route their data flows with the ensuing possibility of making choices, e.g., in terms of pricing and quality of service (QoS) granted.

Figure 5:
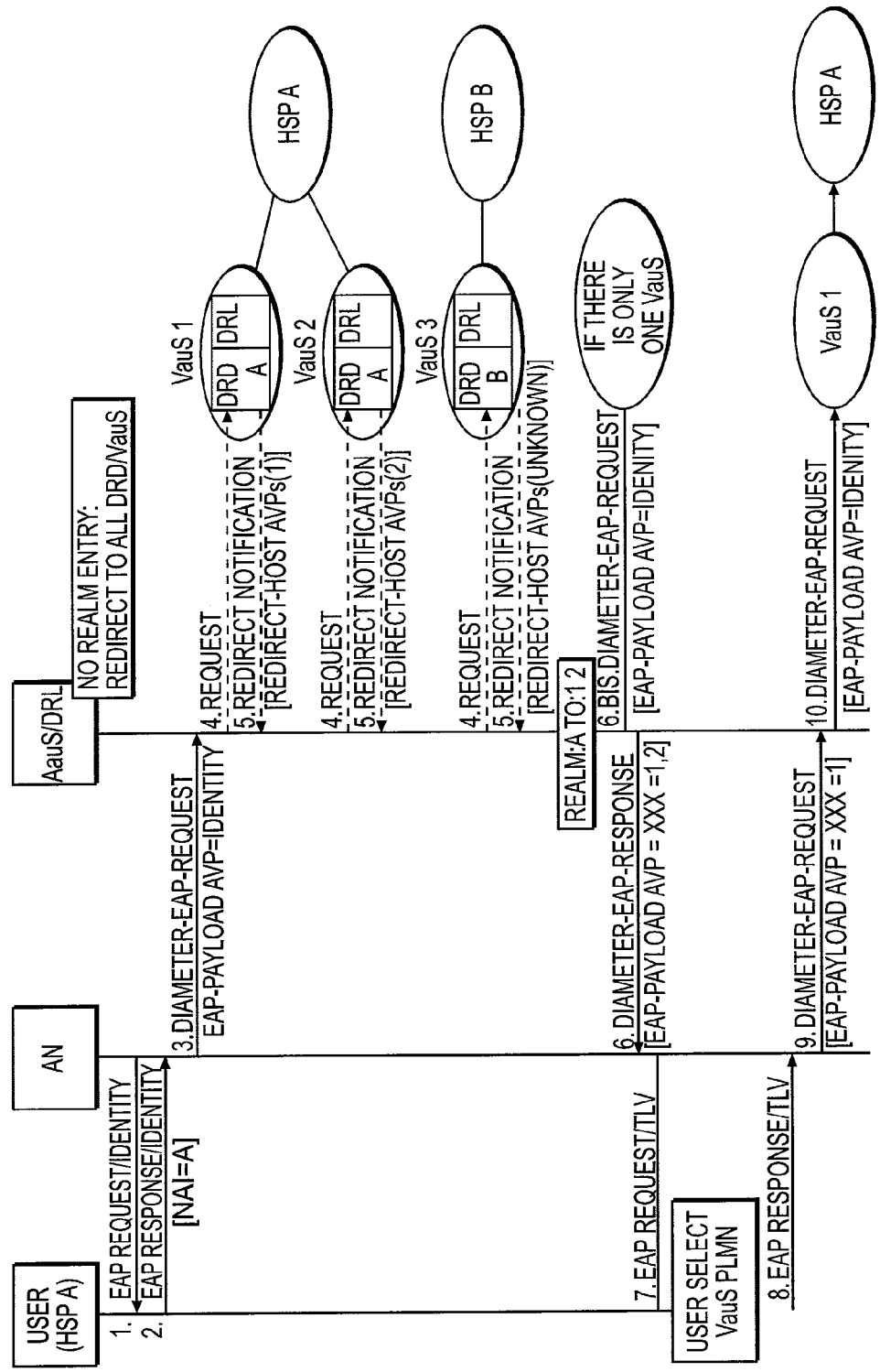
FIG. 5 is a detailed diagram of a network selection procedure in WLAN interworking.

The diagram of FIG. 5 details the procedure described in the following.

As a first step, the access network device sends an EAP-request/identity message to the user equipment (UE) for user's credentials. EAP packets are transported over the wireless LAN interface encapsulated within any wireless LAN technology specific protocol.

As a second step, the UE sends the user identity in an EAP-response/identity message to the access network device complying with a network access identifier (NAI) format as specified in RFC2486. The NAI contains the identifier that allows the AauS to derive the 3G home network name. For instance the UE may send the User A identity as username@HSPA.com or, for those customers that use a SIM module as the identification means, as IMSI@HSPA.com.

As a third step, the access network device forwards the client's EAP-response packet to its relay DRL AauS. Typically, this is encapsulated in a Diameter packet with the client's identity in the Diameter User Name attribute.

As indicated, in the exemplary embodiment considered herein the AauS is a Diameter proxy/relay (DRL) agent adapted to look for the realm in the Diameter-EAP request message. In fact, this would not generally have a routing entry in its Diameter routing table for HSP A.com: this is because direct roaming agreements exist only for only with VauS 1, VauS 2, VauS 3 and the home service provider HSPC.

The routing table, which typically is realm-based is configured in such a way that all the authentication requests whose realm does not correspond to any of those present in the routing table are redirected to all the VauS/DRDs. The AauS thus sends a redirect request to all VauS/DRDs and places the user's request in a pending state. This is essentially a fourth step in the process considered.

As a subsequent, fifth step, all the VauS/DRDs act in this case as redirect agents returning a redirect notification to the AauS/DRL, with the information necessary to reach the home authentication server. The relative information is inserted in one or more instances of redirect host AVP (Attribute Value Pair) in the answer message.

Essentially the following events occur in the exemplary scenario just described.

The VauS1 (DRD) has a roaming agreement with the home service provider HSP A: consequently, it returns to the AauS a redirect notification by setting Redirect-Host AVP=VauS 1. In this way the AauS knows that the VauS 1 is able to forward the authentication request to the home service provider HSPA. The value VauS 1 in the AVP is then used by the AauS to form the PLMN list that is presented to the user to permit selection of the preferred operator.

Also the VauS 2 (DRD) has a roaming agreement with the home service provider HSP A: consequently, it returns to the AauS a redirect notification by setting Redirect-Host AVP=VauS 2. In this way the AauS knows that the VauS 2 is able to forward the authentication request to the home service provider HSPA. The value VauS 2 in the AVP is then used by the AauS to form the PLMN list that is presented to the user to permit selection of the preferred operator.

The VauS 3 (DRD) does not have a roaming agreement with the home service provider HSPA but does have one such agreement with the home service provider HSPB, so it must return a redirect notification with Redirect-Host AVP=Unknown. In this way the AauS knows that the VauS 3 will not be able to forward the authentication request to the home service provider HSPA). The value Unknown in the AVP is used in order to indicate to the AauS not to insert the VauS 3 in the PLMN list.

Other information can be included in the redirect notification such as the AVPs listed in the following.

Redirect-Host-Usage AVP: this AVP dictates how the routing entry from the redirect-host is to be used by the AauS/DRL. When set to ALL-REALM, all the messages destined for the realm requested are sent to the host specified in the redirect-host AVP. In the example described herein, all authentication requests with realm HSPA may be sent by the AauS/DRL to the VauS 1 or VauS 2.

Redirect-Max-Cache-Time AVP: this AVP contains the maximum number of seconds the route table entry, created as a result of the Redirect-Host, will be cached. This AVP avoids that the AauS may have to interrogate all the VauS/DRDs if it receives again an authentication request for some unknown realm. For example, in the example described herein, the AauS can receive at the same time more than one authentication request with realm "HSPA.com". In this way, it already has an available VauS/PLMN list to send to the users. When the timer expires the AauS repeats, if necessary, the redirection process thus updating the routing entries regarding the roaming agreements. The AauS can send an unsolicited redirect message to all the VauS/DRDs for a given realm. The VauS can answer with an unsolicited redirect response message. An alternative is for the AauS to wait for a new authentication request for the particular realm and repeat the redirection process only at this time.

When the AauS has received redirect notifications from all VauS (DRD) it is in a condition to add a routing entry in the realm-based table for the particular realm. In the example described herein, after the redirection procedure, in the AauS routing table there will be an entry for the HSPA realm based on which the authentication requests can be forwarded to VauS 1 or to VauS 2.

Figure 6:
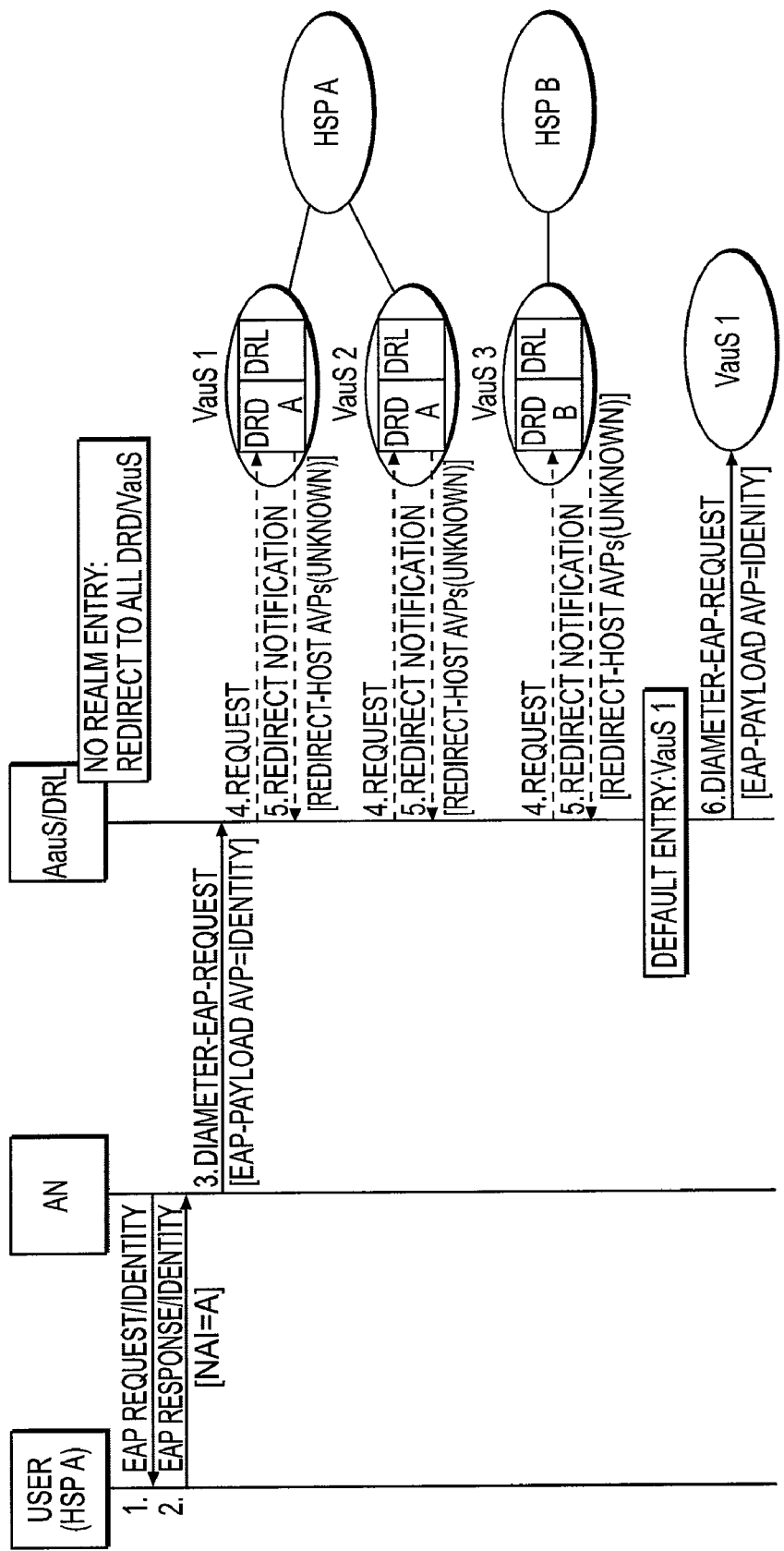
FIG. 6 is a diagram illustrative of network selection in web based access.

As shown in FIG. 6, if the AauS receives all the redirect notifications with the redirect host AVP=unknown, then it forwards the authentication request, as received in the third step above, to the VauS specified in the default entry of its routing table. This operation will be carried out only after the reception of the unsuccessful notifications.

For the authentication of other HSPA users, the AauS has already an entry, so that no redirection procedure is necessary: in such a case the AauS searches the routing table, finds the entry already present and, after completing the third step considered in the foregoing, directly proceeds to either of the sixth step described in the foregoing or to a variant thereof.

The variant in question refers to the case where only one VauS is able to forward the authentication request to the HSP concerned, that is, there is only one VauS that has a roaming agreement with such an HSP.

In the example described herein, when the user B sends his authentication request (this is essentially the third step considered in the foregoing), the AauS does not have a routing entry for the HSPB realm. Therefore it uses a redirection procedure to retrieve the necessary information. In that case, the AauS receives only one redirection message with a valid redirect-host AVP. This message comes from VauS 3, the only one having a roaming agreement with the provider HSPB.

The possibility of choosing a preferred operator (PLMN) will not exist for the user B; as a consequence, the AauS can directly forward the user's credential to VauS 3, as soon as the redirect notification message is received. For this purpose the AauS uses the "Hop-by-Hop" field in the Diameter header to find the user's authentication request in the pending state that must be forwarded.

If, conversely, the possibility of choosing between several VauS/PLMNs exists for the user in question (that is, there exist more than one VauS having a roaming agreement with the desired HSP), the AauS is not required to select one of them as the destination of the redirected message, but will simply give the user the possibility of choosing it in the way detailed in the following. The AauS will support a Diameter EAP application, in order to be able to send the VauS list (PLMN list) to the user through an EAP packet encapsulated in a Diameter message. The Hop-by-Hop field in the Diameter header of the authentication request in the pending state is used by the AauS to send a Diameter/EAP-request message, with an EAP packet encapsulated therein.

This EAP packet includes the VauS/PLMN list. The user chooses the preferred PLMN/VauS operator and sends this choice to the AauS in a Diameter-EAP-response message. Based on the user's selected realm in the EAP packet, the AauS forwards the authentication Pending Diameter-EAP-request/identity message to the VauS selected by the user.

A specific EAP type must be defined in order to transport the VauS/PLMN list towards the user. In FIG. 5 this EAP type is indicated wit xxx.

In the example described herein, the user A receives the VauS/PLMN list from the AauS with the possibility of choosing VauS 1 or VauS 2 (these operations essentially comprising the sixth and seventh steps in the procedure). The User A selects VauS 1 as the prefered PLMN and sends this choice to the AauS, these operations essentially comprising an eighth and a ninth steps in the procedure. Finally, the AauS forwards the pending Diameter-EAP request/identity to VauS1 that in turn forwards (in what is essentially a tenth step in the procedure) the request to the provider HSPA for authentication.

An arrangement has thus been described where the identifiers of the networks available within a WLAN are transmitted to the user. The authentication server retrieves the available roaming networks for that user, identified through e.g. the realm part of the network access identifier (NAI). To accomplish this task, the server initiates a conversation with all the servers belonging to the providers to which it is connected. As a result, the authentication server retrieves the list of the operators having a roaming agreement with the user's home operator. This procedure is performed only once, that is at the first authentication request received by the authentication server for a user for which it does not have a directed roaming agreement with the respective home provider.

Then the authentication server forwards through the access network the list of operators to the user. The user chooses one of the operators included in the list received from the server, according to his local preferences or based on some preconfigured settings. In the case the access provider has a direct roaming agreement with the home provider in question, the user will be presented with a list made of only one operator or the authentication server can decide to directly forward the authentication request. The user sends back to the authentication server in the access network the identifier of the operator selected. At this point, the authentication server forwards to the provider chosen by the user the authentication request, containing the user's credentials.

An alternative possible use of the invention is for web-based user authentication. This has the advantage of extending the use of this solution for client without EAP support.

The procedure for web-based user authentication, which is illustrated in FIG. 7, is described below.

The User A requests a service from a wireless internet service provider ISP, e.g., by "opening" a web browser and by subsequently requesting a URL (FIG. 7, Step 1). The access network device intercepts the user's request and in turn asks the user for his or her credentials, via a HTML page (FIG. 7, Step 1).

The user A submits his or her identity (e.g., in NAI format) and password. The credentials are transported to the access network device using HTTPS (FIG. 7, Step 2). The access network device forwards them to the access authentication server (AauS) using Diameter encapsulation (FIG. 7, Step 2). The access authentication server (AauS) in the WISP retrieves the available roaming networks for that user. These are identified through the realm part of the NAI identifier. To accomplish this task, the server initiates a conversation with all the servers belonging to the providers to which it is connected to, as described previously (FIG. 7, Step 3).

As a result, the authentication server retrieves the list of operators that hold a roaming agreement with the user's operator (FIG. 7, Step 4). The access authentication server (AauS) sends this list of operators to the user (FIG. 7, Step 5).

In the case the access service provider ASP has a direct roaming agreement with the desired home service provider HSP, the user will be presented with a list including only one operator; alternatively the authentication server may decide to directly forward the authentication request.

The list is presented to the user with a new HTML page with IP network selection links. The user chooses one of the operators included in the list received from the server, and the selection is then electronically sent back to the ASP via the AN (FIG. 7, Step 6).

At this point, the authentication server forwards the authentication request, containing the user credentials, to the provider chosen by the user (FIG. 7, Step 7). The home authentication server accepts the user credential, checks the user's identity for validation and if authentication is successful, orders to the access authentication server to give the user service (FIG. 7, Step 8).

The arrangement described is based on the use of a Diameter agents. Of course, other "triple-A" protocols such as Radius may be successfully used, even though some of these may not provide for explicit support for agents, including proxies, redirects and relays.

Consequently, without prejudice to the underlying principle of the invention, the details and the embodiments may vary, also significantly, with respect to what has been described in the foregoing, just by way of example, without departing from the scope of the invention as defined by the annexed claims.

The invention claimed is:

1. A method for giving to at least one user access to a respective home operator over a communication network, said access being via an access network and through any of a plurality of supported visited networks, wherein at least one of said supported visited networks comprises a proxy/relay agent for those authentication requests that must be forwarded towards an identified operator and a redirect agent for those authentication requests that have an unknown realm, whereby said at least one user is given the possibility of selecting one of said supported visited networks as the path for reaching said respective home operator, the method further comprising:

receiving from said at least one user, user credentials at said access network, wherein the user credentials comprise a realm-identification component;

forwarding said user credentials to an authentication function at said access network; and searching in a routing table for a realm identified by the realm-identification component, wherein when the realm is not included in the routing table, further performing the steps of:

simultaneously redirecting to all said supported visited networks the user credentials whose realm-identification component does not correspond to any realm identified in the routing table;

returning from said supported visited networks to said access network redirect notifications as well as contact information to said user's respective home operator;

retrieving a set of available roaming networks for said at least one user, thus retrieving a list of operators holding a roaming agreement with said respective home operator of said at least one user;

forwarding said list to said at least one user;

receiving from said at least one user at said authentication function an identifier of an operator selected from said list; and forwarding to the operator identified by said identifier a user's authentication request.

2. The method of claim 1, comprising the step of including the user credentials in said user's authentication request.

3. The method of claim 1, comprising the steps of: assigning to said at least one user a Network Access Identifier (NAI); and identifying said at least one user through the realm part of said NAI.

4. The method of claim 1, wherein said steps of receiving and forwarding user credentials and retrieving a set of available roaming networks is performed only once, when a first authentication request is received by said authentication function in respect to a user for which no direct roaming agreements exist with said user's respective home operator.

5. The method of claim 1, wherein, when said access network has a direct roaming agreement with said user's respective home operator, comprising the step of forwarding to said at least one user a list including said user's respective home operator only.

6. The method of claim 1, wherein, when said access network has a direct roaming agreement with said user's respective home operator, comprising the step of directly forwarding the user's authentication request to said user's respective home operator.

7. The method of claim 1, comprising the step of proxying said user's authentication request from said operator identified by said identifier to said user's respective home operator.

8. The method of claim 1, comprising the step of selecting said authentication function as an Extensible Authentication Protocol (EAP) based function.

9. The method of claim 1, comprising the step of including in at least one of said access network and said supported visited networks a Diameter node.

10. The method of claim 1, comprising the step of including in said access network a proxy/relay agent.

11. A communication network arranged for giving to at least one user access to a respective home operator via an access network and through any of a plurality of supported visited networks, wherein:

at least one of said supported visited networks comprises a proxy/relay agent for those authentication requests that must be forwarded towards an identified operator, and a redirect agent for those authentication requests that have an unknown realm, whereby said at least one user is given the possibility of selecting one of said supported visited networks as the path for reaching said respective home operator;

said access network has an associated authentication server, said access network being configured for receiving, from said at least one user, user credentials comprising a realm-identification component and forwarding said user credentials to said authentication server; and searching in a routing table for a realm identified by the realm-identification component, wherein when the realm is not included in the routing table, further performing the steps of:

simultaneously redirecting to all said supported visited networks the user credentials whose realm-identification component does not correspond to any realm identified in the routing table;

returning from said supported visited networks to said access network redirect notifications as well as contact information to said user's respective home operator;

said authentication server being configured for retrieving a set of available roaming networks for said at least one user, thus retrieving a list of operators holding a roaming agreement with said respective home operator of said at least one user, and forwarding said list to said at least one user; and said authentication server being further configured for receiving from said at least one user an identifier of an operator selected from said list, and forwarding to the operator identified by said identifier a user's authentication request.

12. The communication network of claim 11, wherein said authentication server is configured for including the user credentials in said user's authentication request.

13. The communication network of claim 11, wherein said at least one user is identified by a Network Access Identifier (NAI) and said access network is configured for identifying said at least one user through the realm part of said NAI.

14. The communication network of claim 11, wherein said authentication server is configured for receiving and forwarding user credentials and retrieving a set of available roaming networks only once, when a first authentication request is received by said authentication server in respect to a user for which no direct roaming agreements exist with said user's respective home operator.

15. The communication network of claim 11, wherein said access network has a direct roaming agreement with said user's respective home operator and said access network is configured for forwarding to said at least one user a list including said user's respective home operator only.

16. The communication network of claim 11, wherein said access network has a direct roaming agreement with said user's respective home operator and said access network is configured for directly forwarding the user's authentication request to said user's respective home operator.

17. The communication network of claim 11, wherein said supported visited networks are configured for proxying said user's authentication request from said operator identified by said identifier to said user's respective home operator.

18. The communication network of claim 11, wherein said authentication server is an Extensible Authentication Protocol (EAP) based server.

19. The communication network of claim 11, wherein at least one of said access network and said supported visited networks is configured as a Diameter node.

20. The communication network of claim 11, wherein said access network includes a proxy/relay agent.

21. The communication network of claim 11, in the form of an Internet Protocol (IP) network.

22. A computer readable medium encoded with a computer program product loadable into a memory of at least one computer and including software code portions for performing the steps of any one of claims 1 or 2-10.

* * * * *